United States Patent [19]
Labeye et al.

[11] Patent Number: 5,848,206
[45] Date of Patent: Dec. 8, 1998

[54] DEVICE FOR COMPENSATING DEFORMATIONS OF A PART OF AN OPTOMECHANICAL OR MICROMECHANICAL SYSTEM

[75] Inventors: Pierre Labeye; Eric Ollier, both of Grenoble, France

[73] Assignee: Commissariat A L'Energie Atomique, Paris, France

[21] Appl. No.: 549,970

[22] Filed: Oct. 30, 1995

[30] Foreign Application Priority Data

Nov. 10, 1994 [FR] France ................................. 94 13559

[51] Int. Cl.⁶ .............................. G02B 6/26; G01P 15/00
[52] U.S. Cl. ................................. 385/22; 385/16; 385/19; 73/514.21; 73/514.24; 73/514.36; 73/514.38
[58] Field of Search ................................. 385/16, 22, 19, 385/25, 31, 32, 39, 40, 50, 52; 73/514.15–514.38

[56] References Cited

U.S. PATENT DOCUMENTS

| | | | |
|---|---|---|---|
| 4,353,259 | 10/1982 | Schneider, Jr. | 73/653 |
| 4,607,910 | 8/1986 | Thurenius | 385/23 |
| 4,946,247 | 8/1990 | Muska et al. | 385/16 |
| 5,078,514 | 1/1992 | Valette et al. | 385/20 |
| 5,239,599 | 8/1993 | Harman | 385/16 |

FOREIGN PATENT DOCUMENTS

| | | |
|---|---|---|
| 0451018 | 10/1991 | European Pat. Off. . |
| 3140584 | 8/1982 | Germany . |
| 92/14160 | 8/1992 | WIPO . |

OTHER PUBLICATIONS

IEEE Transactions on Electron Devices, vol. ed–25, No. 10, Oct. 1978, pp. 1241–1249, K. E. Petersen, "Dynamic Micromechanics on Silicon: Techniques and Devices".

Journal of Applied Physics, vol. 39, No. 99, pp. 4458–4459, Aug. 1968, C. M. Drum, "A Low–Stress Insulating Film on Silicon by Chemical Vapor Deposition".

International Conference on Solid State Sensors and Actuators, Digest of Technical Papers, pp. 957–960, 1991, no month M. Orpana et al., "Control of Residual Stress of Polysilicon Thin Film by Heavy Doping in Surface Micromachining".

*Primary Examiner*—Akm E. Ullah
*Assistant Examiner*—Hemang Sanghavi
*Attorney, Agent, or Firm*—Pearne, Gordon, McCoy & Granger LLP

[57] ABSTRACT

Device for compensating deformations of a part of an optomechanical or micromechanical system. This device compensates deformations, in a first direction (z), of a mobile part (26) of an apparatus, e.g. of a micromechanical and optomechanical nature, said mobile part being displaceable in a second direction (y), and having at least one arm (50, 52) connecting on the one hand a free end of the mobile part and a fixed part (16) of the apparatus, said arm having an adequate flexibility in the second direction (y), so as not to impede the displacement of the mobile part in said second direction (y), and an adequate rigidity in the first direction (z), so as to limit the deformations of the mobile part in said first direction.

33 Claims, 4 Drawing Sheets

DEVICE FOR COMPENSATING DEFORMATIONS OF A PART OF AN OPTOMECHANICAL OR MICROMECHANICAL SYSTEM

TECHNICAL FIELD TO WHICH THE INVENTION RELATES

The invention relates to procedures for compensating parasitic deformations, in certain directions, of mobile parts of measuring apparatuses, such as vibration pick-ups (e.g. microphone) or accelerometers, or apparatuses such as electro-optic switches used in telecommunications networks.

These procedures essentially relate to microstructures. Thus, the invention is essentially used in the fields of micromechanics or optomechanics e.g. using integrated optics.

PRIOR ART

Different procedures have been proposed to solve, either in the optomechanical field, or in the micromechanical field, the problems of parasitic deformations, in a certain direction, of certain mobile parts of apparatuses, the mobility of said parts taking place in one or more different directions compared with the direction in which the deformation is exerted.

Generally an optomechanical system using integrated optics requires the deposition of films on a substrate. As a result of the methods and materials used, the resulting films have a stress inhomogeneity in their thickness. This leads to a parasitic deformation of the system, in the direction perpendicular to the plane of the substrate, when the structure of the substrate. In general, the integrated optics cannot accept such deformations, which can lead to the offcentring or displacement of the optical guide structures with respect to one another. Thus, in such structures, displacements of approximately 1 micron lead to significant optical losses.

Hitherto, for avoiding deformation problems, in the optomechanical field use has been made of the following procedures:

either structures liable to offcentre two optical guides with respect to one another are avoided, or structures are produced, whose sought deformation is controlled, in the direction perpendicular to the substrate, so that it is possible to take up the parasitic deformation due to stresses.

However, these two procedures significantly limit the structures which can be envisaged and therefore the applications of optomechanics.

In the micromechanical field, the materials used are usually silicon in its different forms and more particularly silica, quartz, GaAs and polymers. These materials are treated by technologies, which can be classified in two groups:

a first group in which the structure is produced in the substrate with the aid of the wet etching method, making use of the preferred etching directions of crystals, methods where the structure is produced in films deposited beforehand on a substrate, this taking place by using dry and wet etching methods. The structure is then freed by isotropically etching a sacrificial layer positioned below.

In virtually all these structures, with the exception of those produced in monocrystals, there are parasitic deformation problems due to internal stresses. There are two types of stresses, namely thermal stresses due to the expansion coefficient difference of the different films or layers and intrinsic stresses directly linked with the structure of the deposited materials.

The solutions which have been proposed for solving these stress problems are greatly dependent on the material and the deposition methods. In general, these solutions attempt to act on the intrinsic stresses of the material. Thus, it is possible to act on:

the deposition temperature, it being preferable to perform deposition at low temperatures to limit stresses, the nitrogen percentage in the silicon and depending on whether the movement is towards the $Si_3N_4$ or $SiO_2$ structure, there are layers in tension or in compression, as described in the article by C. M. Drum, entitled: "A low-stress insulating film on silicon by chemical vapor deposition", published in Journal of Applied Physics, vol. 39, No. 99, pp 4458/9, August 1968, doping—as a function of the nature of the atoms placed in substitution, there are stresses in compression or in tension and it is also possible to use an annealing stage making it possible to bring about a release of the stresses by heating, such procedures being described in "Control of residual stress of polysilicon thin film by heavy doping in surface micromachining", by M. ORPANA et al, 1991, International Conference on solid state sensors and actuators, Digest of Technical Papers, pp 957–960 but, like the methods referred to hereinbefore in the field of integrated optics, these procedures suffer from the following disadvantages:

they require a direct intervention on the material and/or on the geometry of the components, the require an additional technical stage, even if the stages are performed simultaneously with the formation of the components.

In addition, the solutions used in micromechanics are very difficult to transpose to optomechanics.

Thus, in the field of optomechanics, films deposited on a substrate are used. However, in most cases, the micromechanical methods applied to these components serve to minimize the total, average stress in the film, so as to limit the deformation of the substrate-film assembly. When the structure is produced in films only, the origin of the deformations is no longer in the average stress of the film, but in the stress gradient therein. This gradient can be due to:

the difference in stresses between the different films having different optical indices, necessary for the integrated optical structure (e.g. silica film with different phosphorus doping), the difference in the intrinsic or thermal stresses between the material forming the optical structure (e.g. silica) and a possible film deposited above in order to obtain a particular function (e.g. aluminium for producing electrodes), a stress gradient which can exist in the same film, as a function of the deposition method, impurities, etc., due to the fact that the films used are not monocrystalline films and are deposited on the substrate by various methods (PECVD, LPCVD, APCVD, thermal growth, sputtering, etc.) and this necessarily leads to stress and consequently parasitic deformation problems.

It is also not possible to act freely on the thicknesses of the different optical films or coatings with a view to balancing stresses, because this could to a deterioration or even the destruction of the optical guidance.

In addition, for an optomechanical component there are limitations with respect to the material. Thus, the production of an optical guidance involves a precise control of the optical indices of the materials. However, all the materials influencing the structure of the material also influence its index. Thus, it is very difficult to use conventional micromechanical methods on silicon, which treats, sometimes in a violent manner, the complete material (e.g. by thermal annealing, doping, etc.).

Moreover, the addition of supplementary coatings with a view to balancing the stresses also leads to significance risks from the optical guidance standpoint, due to index problems.

DESCRIPTION OF THE INVENTION

The present invention aims at solving these problems. More particularly, it proposes a solution making it possible to avoid any treatment of the substrates or films of components encountered in the field of micromechanics or the field of optomechanics.

More specifically, the present invention relates to a device for compensating deformations, in a first direction, of a mobile part of a micromechanical apparatus or an apparatus having an optical guidance structure, the mobile part having two ends; whereof one, called the fixed end, is attached to a fixed part of the apparatus and whereof the other, called the free end, said mobile part thus being displaceable in a second direction, different from the first direction, said compensation device being characterized in that it has at least one arm connecting on the one hand the free end of the mobile part and on the other the fixed part of the apparatus, said arm or arms having an adequate flexibility in the second direction, so as not to impede the displacement of the mobile part in said second direction, and an adequate rigidity in the first direction, so as to limit the deformations of the mobile part in said first direction.

The compensation device according to the invention is entirely mechanical and avoids any treatment of the structure or the mobile part, whose deformation is to be compensated and in particular any heat treatment or chemical treatment. In the case where the apparatus has guiding optical structures, there has to be no interference with the geometry of these structures. In addition, a supplementary technical stage compared with those concerning the preparation of the coatings or films is avoided. For example, if the mobile part is etched, the compensating structure is etched at the same time as the main structure, i.e. at the same time as the mobile part. In addition, the etching method is easier to carry out than the other solutions, which aim at bringing about an equilibrium of the stresses, e.g. by doping or annealing.

Advantageously, the compensation arm or arms are connected to the fixed part positioned laterally of the mobile part or to the fixed part facing the free end of said mobile part. The mobile part can comprise several interconnected beams.

The present invention also relates to a process for determining the dimensioning of the arm or arms of a compensating device like that described hereinbefore, said process being characterized in that:

- determination takes place at one point, called the critical point, of a parasitic deformation D of the mobile part, in the first direction, in the case where the mobile part has no deformation compensating device,
- calculation takes place of the equivalent mechanical loading P bringing about the parasitic deformation D at the critical point,
- the mechanical loading P is applied to the assembly constituted by the mobile part and the compensating device and from it is deduced the parasitic mechanical deformation $D_t$ of the mobile part with the compensating system,
- determination takes place of the dimensioning of the compensating device, so that the parasitic mechanical deformation $D_t$ is below a desired limit value $D_c$.

Other aspects of the invention can be gathered from the dependent claims.

BRIEF DESCRIPTION OF THE DRAWINGS

The features and advantages of the invention can be better understood from the following illustrative, non-limitative description of embodiments with reference to the attached drawings, wherein show.

DETAILED DESCRIPTION OF EMBODIMENTS OF THE INVENTION

Figure 1:
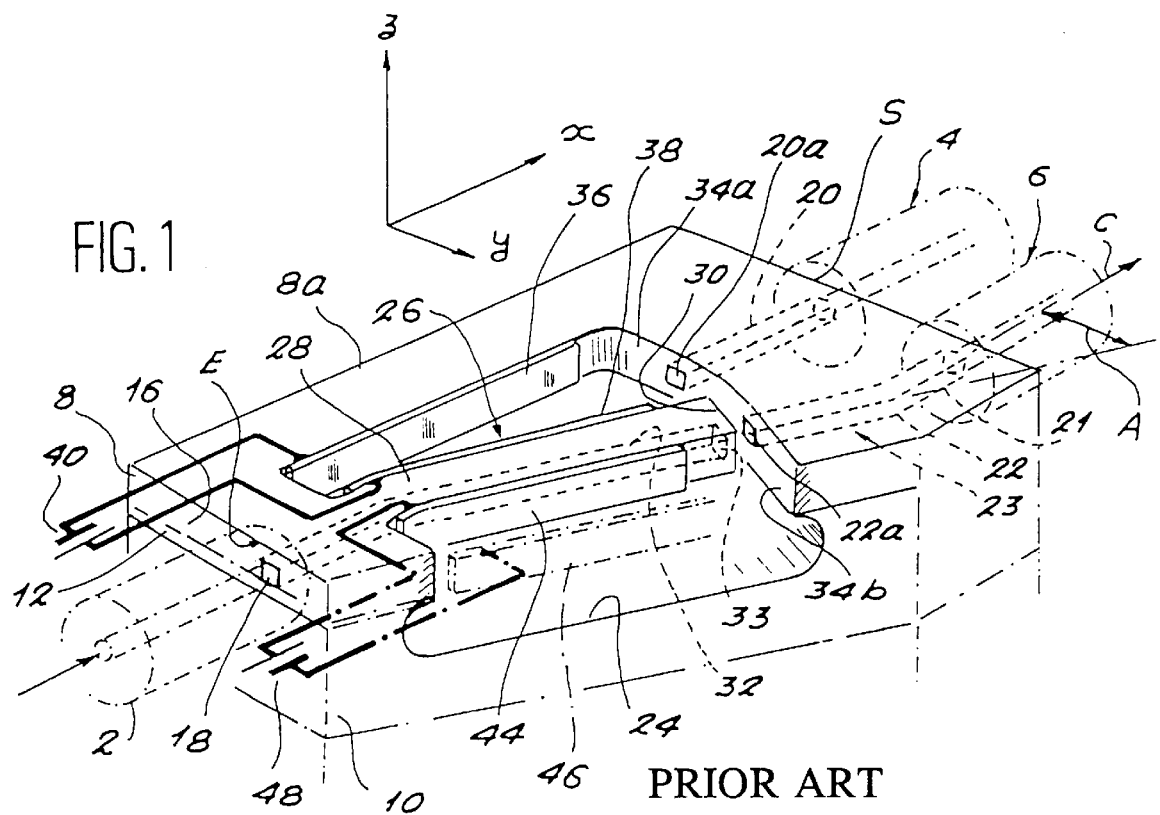
FIG. 1 A prior art, optomechanical switch with no compensating system.

The invention will firstly be described in the case of the application to an optomechanical switch. Such a switch and its production process are described in FR-A-2 660 444 (corresponding to U.S. Pat. No. 5,078,514). The structure of the switch described in said patent will now be briefly described in conjunction with FIG. 1.

The switch comprises a flat layer or guidance structure 8 (which can be formed from one or more layers or films), which is produced on a substrate 10, e.g. of monocrystalline silicon, and which has an entrance face E and an exit face S, which are strictly parallel and which are e.g. obtained by cleaving. The guidance structure 8 e.g. has a silicon dioxide buffer layer 12 (8 to 12 $\mu$m thick) and an upper silica layer 16 (2 to 10 $\mu$m thick) whereby the latter layer can in certain applications be replaced by air. The guidance structure also comprises an entrance microguide 18 and two exit microguides 20, 22, made from e.g. phosphorus-doped silicon dioxide, with a height of 2 to 6 $\mu$m and a width of 2 to 8 $\mu$m. The microguides 18 and 20 are parallel to a direction x, which is itself parallel to the largest surface 8a of the flat layer or guidance structure 8 and they are located in the extension of one another and on either side of a recess 24 traversing the guidance structure 8. Another exit microguide 22 is located on the same side of the recess 24 as the microguide 20 and is adjacent to the latter. On the side of the switch outlet or exit S, it has a part 21, which is strictly parallel to the microguide 20 and, on the side of the recess 24, a part 23 forming a reentrant angle A with the part 21 with an approximate value of 0.06° to 6°, said value being linked with the length of the beam.

Hereinbefore has been give a particular embodiment of a guidance structure, but the invention is applicable to other structure types such as e.g. those obtained by ion exchange in substrates of the glass or lithium niobate type, or by depositions or etchings of silica-type coatings, $Si_3N_4$, $SiO_xN_y$, GaAs, InP, etc., the lateral confinement in the microguide not being necessarily obtained by etching the layer forming the microguide.

In the fixed structure 8, the recess 24 defines a flexible beam 26 oriented, in the inoperative state, parallel to the direction x, said beam being deformable in the recess 24 in a direction y, parallel to the surface 8a of the guidance structure, which defines a fixed part, and perpendicular to the direction x. This beam 26 comprises a fixed end 28, integral with the guidance structure 8, and a free end 30 able to move in the recess 24. In the extension of the entrance microguide 18, a central microguide 32 extends over the entire length of the beam 26, its end 33 issuing at the end 30 thereof.

The switching of the incident beam carried by the entrance microguide to the exit microguide 20 is brought about by bringing the free end 33 of the central microguide of the beam in front of and in coincidence with the entrance end 20a of the exit microguide 20. The switching to the exit microguide 22 takes place by bringing the free end 33 of the central microguide in front of and coinciding with the entrance end 22a of the exit microguide 22. The inner wall of the recess 24 facing the free end 30 of the beam is formed by two parts 34a, 34b forming a reentrant angle with a value close to or identical to the angle A. The deformations of the beam for bringing the latter into coincidence with one or other of the exit microguides are ensured in the embodiment shown in FIG. 1 with the aid of variable capacitance capacitors. To this end, the lateral surfaces of the recess 24, at the guidance structure 8, oriented in the direction x, are equipped with metal coatings 36, 46 respectively. The lateral faces of the beam 26, which face one another and oriented in the direction x when the latter is in the inoperative state, are provided with metal coatings 38, 44 respectively. The metal coatings 36 and 38 are connected to an electric power supply 40, whilst the metal coatings 44, 46 are connected to an electric power supply 48. The application of an appropriate voltage to the terminals of the pair of capacitors formed in this way creates a capacitive force parallel to the direction y and which brings about a deformation of the beam 26 in said direction y. This force $F_c$ permits a lateral displacement $y_c$ of the free end of the beam 26, along y, which is given by the equation:

$$y_c = 3/2 \cdot F_c \cdot h^{-1} \cdot \left(\frac{L}{l}\right)^3 \cdot E^{-1}$$

in which E is the modulus of elasticity, l the width of the beam in direction y, L the length of the beam in direction x and h the thickness of the beam in direction z.

The production process for this structure is given in the aforementioned patent and involves:
- a stage of forming the layer 12, e.g. by the thermal oxidation of the substrate 10,
- the deposition of a silica layer by LPCVD or PECVD,
- an etching stage performed through a mask defined by photolithography in order to obtain the microguide 32,
- a stage of depositing the layer 16 by low pressure chemical vapour deposition (LPCVD) or plasma assisted chemical vapour deposition (PECVD),
- anisotropic and isotropic etching stages of the reactive ion etching type using either $CHF_3$ or $SF_6$, said latter etching stages making it possible to free the beam 26 from its substrate.

Figure 2A:
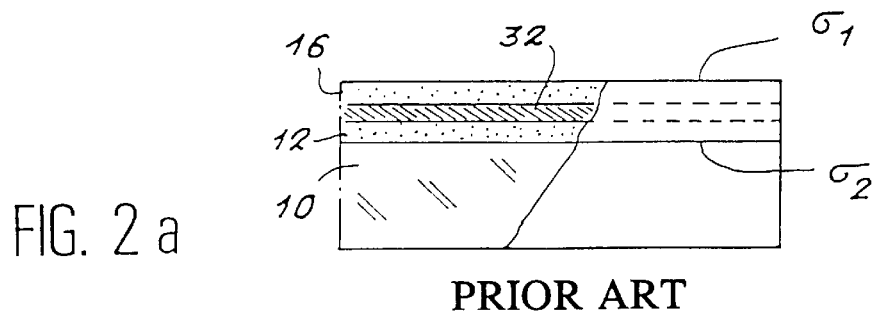
FIGS. 2a & 2b Stages in the production of a prior art optomechanical switch before (FIG. 2a) and after (FIG. 2b) the etching of the substrate.
Figure 2B:
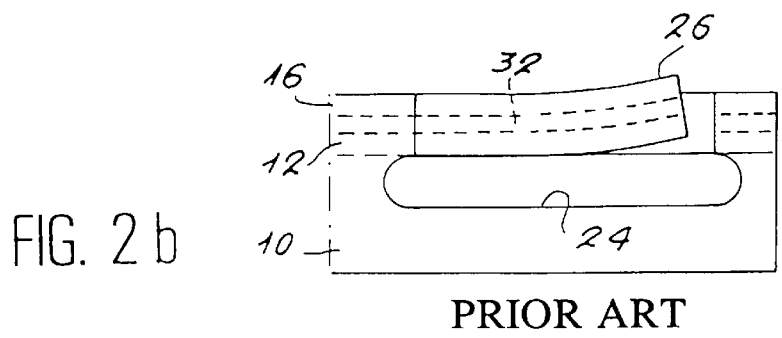

The stage of producing the silica beam by PECVD with the different phosphorus doping operations, leads to a stress gradient in the vertical direction y, which causes a deformation of the system. This is illustrated in FIG. 2a, where identical numerical references to those of FIG. 1 designate the same elements. FIG. 2a shows the structure obtained prior to the beam release stage. In FIG. 2a, $\sigma_2$ designates the stress at the interface between the substrate 10 and the film (12, 32, 16) and $\sigma_1$ designates the stress on the surface of the film. Due to differences of nature between the films 12, 32 and 16, as well as the phosphorus doping differences in the film or layer, there is a stress gradient in the film. The stress $\sigma_2$ is lower than the stress $\sigma_1$. On freeing the beam 26, i.e. on hollowing out the cavity 24 beneath said beam, this leads to a vertical deviation of the beam, which completely offcentres the entrance and exit optical guides, so that the optical switch is rendered inoperative, as illustrated in FIG. 2b.

Figure 3:
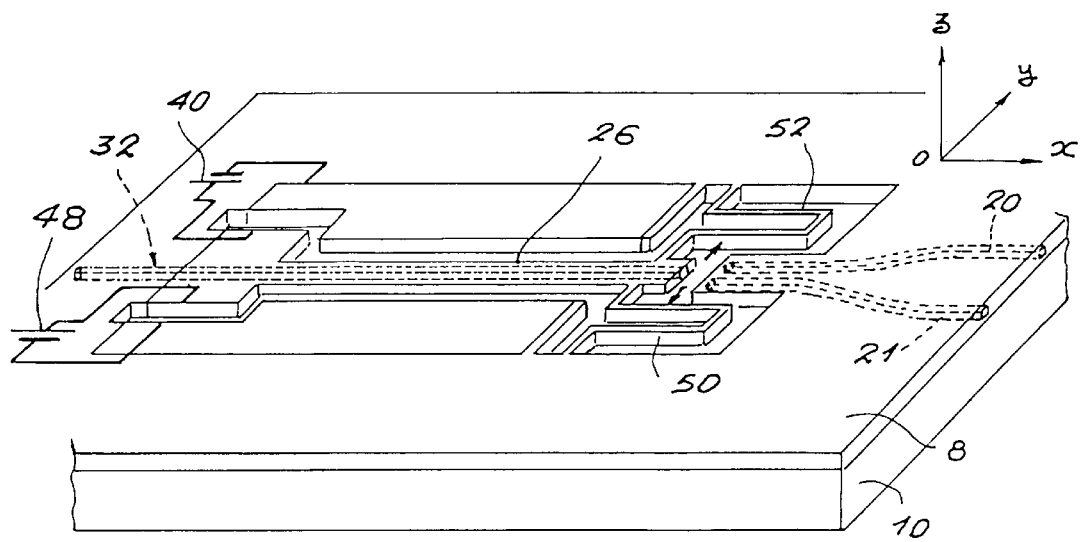
FIG. 3a An optomechanical switch with a compensating system according to the invention.
FIG. 3b In greater detail a compensating arm.
Figure 3:
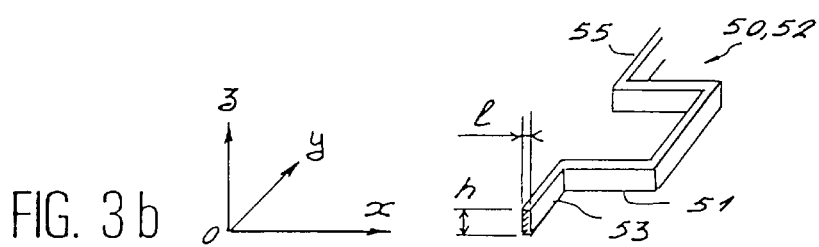

In the case of the optical switch, a first solution to the problem falling within the scope of the present invention, is illustrated in FIG. 3a. Identical references to those of FIG. 1 represent the same elements. The assembly is shown more diagrammatically than in FIG. 1.

The compensating system is constituted by two arms 50, 52, which connect the free end of the beam 26 to the remainder of the structure 8, which is a fixed part, because it is connected to the silicon substrate 10. As can be seen in greater detail in FIG. 3b, each arm 50, 52 can be constituted by a U-shaped body 51, one branch 53, 55 being added to the free end and substantially perpendicular to each lateral branch of the U. The free end of one of these branches 53, 55 is connected to the beam 26, the free end of the other branch being connected to the remainder of the guidance structure 8. The same applies with respect to the second compensating arm.

The geometry of the compensating arms can be envisaged in different ways. However, the arms must be rigid in the vertical direction (z direction) and flexible in the horizontal direction (xy plane). It is possible to act on the geometry of the arms by increasing the width/height shape factor, the height h and the width l being identified in FIG. 3b as the height of the section of the compensating arm in a vertical section (along a plane parallel to zx) and the width l being the width of the compensating arm in the same vertical section. By acting on this shape factor, it is possible to obtain an adequate flexibility, in the xy plane, so as not to impede the displacements of the beam in said same plane and an adequate rigidity, in the z direction, to limit the deformations of the beam in said same direction. According to another embodiment, the arms are straight.

Figure 4:
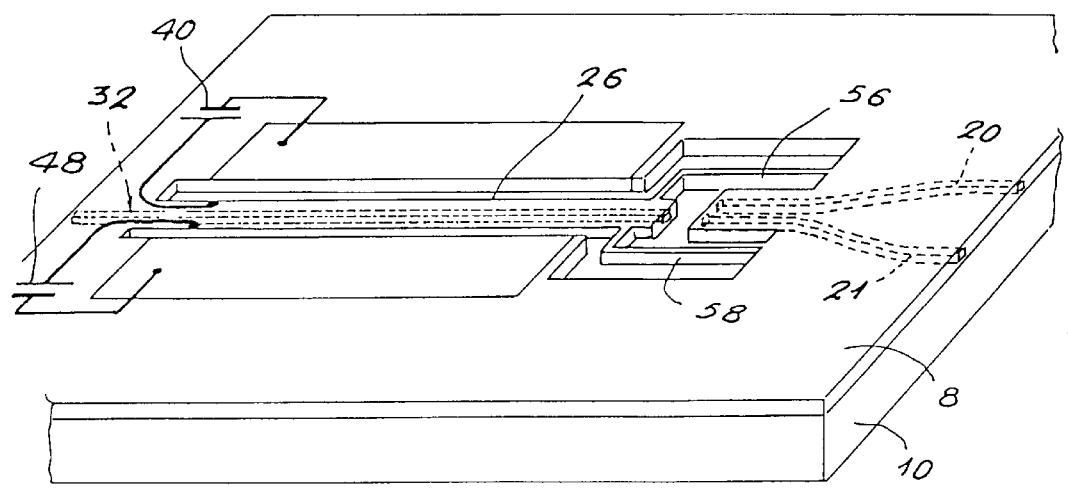
FIG. 4 An optomechanical switch with a compensating device according to a variant of the invention.

Another embodiment of the compensating arms, in the case of an optomechanical switch, is illustrated in FIG. 4. In FIG. 4 it is once again possible to see two compensating arms 56, 58, but each arm is approximately right-angled with two segments substantially perpendicular to one another. Once again action takes place on the width/height shape ratio of the section of each arm, so as to give it the desired rigidity in the vertical direction and the desired flexibility in the horizontal plane.

The system can also function with a single compensating arm. Nevertheless, a preferred embodiment is that where the system is symmetrical in the horizontal plane (as in FIGS. 3a and 4, with respect to a median plane parallel to zOx). More generally, if the mobile part whose deformations are to be correct has a certain spatial symmetry, it is desirable for the compensating system to have the same symmetry. This geometry makes it possible to avoid small lateral deformations which could appear through buckling of the arms, due to the fact that the silica or material forming the mobile part is overall in compression.

The following method makes it possible to model and simulate the influence of the inhomogeneity of the stresses in the main structure, or mobile part, whose deformation is to be compensated, and from it can be deduced a more precise dimensioning of the compensating arms, so that the deformation does not exceed a critical value.

A parasitic deformation D of the mobile part, e.g. due to an inhomogeneous distribution of the stresses therein is observed and said deformation is measured at the critical point of the structure. This is followed by a calculation of what equivalent, simple, mechanical loading P (force, moment) would bring about the same deformation D at the critical point without any compensating system. This loading P is theoretically applied to the complete structure, i.e. to the preceding structure to which has been added the compensating structure. This is followed by an analysis of the way of dimensioning said compensating structure in order that the parasitic deformation of the complete system at the critical point is below a desired limit value $D_c$. The term critical point is understood to mean the centre of the beam at its free end.

It is possible to analytically model the system using the mechanical theory of beams. Thus, firstly, before the stages described hereinbefore, the mobile part in question can be reduced to an equivalent beam having the same length, the same moment of inertia and the same modulus of elasticity as said mobile part. The following modelling is valid for beams of different geometries, the geometry differences occurring in the calculation of the moments of inertia of said beams.

Figure 5:
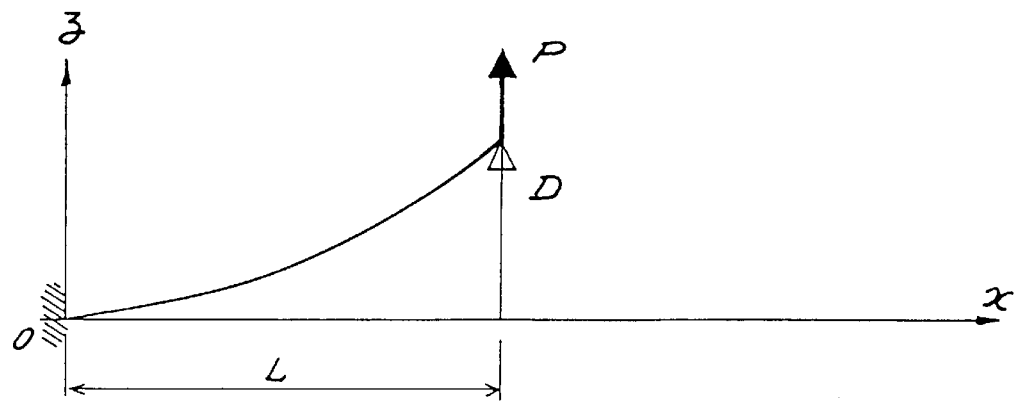
FIGS. 5a & 5b Stages in a dimensioning process of a compensating device according to the invention.
Figure 5:
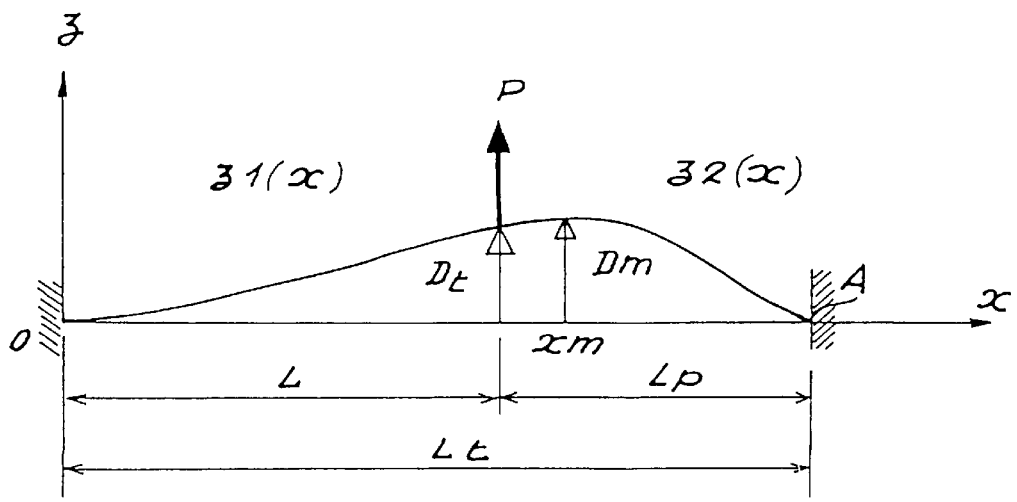

In order to define the notations, reference should be made to FIGS. 5a and 5b. FIG. 5a shows the deviation D of a simple beam of length L and rigidity $E_1 x I_1$, under the action of a punctiform force P applied to its free end. FIG. $5_b$ shows the same beam of length L with its compensating system. The latter is reduced to the model of a beam of length $L_p$, one of whose ends is housed in a fixed support, at a point A, whereas the other, free end is connected to the free end of the beam of length L. The latter is housed in a support fixed at a point O, which is taken as the origin of a coordinate system Oxz. The assembly of the two beams has a length $L_t=L+L_p$. The compensating system has a rigidity $E_2 x I_2$. In addition, the following notations are adopted:

$E_1$ the modulus of elasticity of the main beam,
$I_1$ the moment of inertia of the main beam,
$E_2$ the modulus of elasticity of the compensating beam,
$I_2$ the moment of inertia of the compensating system,
$D_t$ the deviation of the critical point at the end of the main beam with the compensating system,
$D_m$ the maximum deviation of the complete system (main beam+compensating beam),
$x_m$ the longitudinal position of the maximum deviation point of the complete system.

There is firstly a deviation D, in direction z, of the main beam, without compensating system. The force necessary for obtaining this beam deviation D, with no compensating system, is given by:

$$P = \frac{3 \cdot E_1 \cdot I_1}{L^3} \cdot D$$

Said force P is then applied to the complete system, i.e. the main beam+compensating beam, the P application point still being located at the end of the main beam at the critical point. Using the theory of beams in the field of material strength, it is then possible to determine the deformation of the system on either side of the application point, i.e. for each abscissa point x along the main beam or compensating beam, the amplitude of the deviation being respectively $z_1(x)$ or $z_2(x)$.

The studied system is represented in FIG. 5b. As a result of the nature of the supports (2 housings), the studied structure constitutes a hyperstatic system, i.e. the static equations are no longer sufficient for determining all the support reactions. It is therefore necessary to establish supplementary relations based on the consideration of the deformation of the system. These supplementary conditions are based on the fact that the deformation of the system must have a tangent horizontal to the two housing points.

Using the conventional hypotheses of the mechanics of beams (Hooke's law, low deformations, pure bending), as well as the superposition theorem, it is possible to determine the deformation of the complete system (main beam and compensating system). The deformation of the system is then obtained for $0<X<L$:

$$z_1(x) = \frac{1}{E_1 \cdot I_1} \cdot \left( -\frac{P \cdot L_p}{6 \cdot L_t} \cdot x^3 + C_1 \cdot x \right) + \frac{1}{E_1 \cdot I_1} \cdot$$

$$\left( \frac{M_a}{6 \cdot L_t} \cdot (L_t - x)^3 + C'_1 \cdot x + C'_2 \right) +$$

$$\frac{1}{E_1 \cdot I_1} \cdot \left( -\frac{M_b}{6 \cdot L_t} \cdot x^3 + C''_1 \cdot x \right)$$

For $L < x < L_t$:

$$z_2(x) = \frac{1}{E_2 I_2} \cdot \left( -\frac{P \cdot L_p}{6 \cdot L_t} \cdot x^3 + \frac{P}{6} \cdot (x-L)^3 + D_1 \cdot x + D_2 \right) +$$

$$\frac{1}{E_2 \cdot I_2} \left( \frac{M_a}{6 \cdot L_t} \cdot (L_t - x)^3 + D'_1 \cdot x + D'_2 \right) +$$

$$\frac{1}{E_2 \cdot I_2} \left( -\frac{M_b}{6 \cdot L_t} \cdot x^3 + D''_1 \cdot x + D''_2 \right)$$

with:

$$C_1 = \frac{P \cdot L_p \cdot L^2}{6 \cdot L_t^2} \cdot \left( 1 - \frac{E_1 \cdot I_1}{E_2 \cdot I_2} \right) \cdot (L_t + 2 \cdot L_p) +$$

$$\frac{E_1 \cdot I_1}{E_2 \cdot I_2} \cdot \frac{P \cdot L_p}{6 \cdot L_t} \cdot (L_t^2 - L_p^2)$$

$$D1 = \frac{P \cdot L_p}{6 \cdot L_t} \cdot (L_t^2 - L_p^2) + \frac{P \cdot L_p \cdot L^3}{3 \cdot L_t^2} \cdot \left( 1 - \frac{E_2 \cdot I_2}{E_1 \cdot I_1} \right)$$

$$D2 = \frac{P \cdot L_p \cdot L^3}{3 \cdot L_t} \cdot \left( 1 - \frac{E_2 \cdot I_2}{E_1 \cdot I_1} \right)$$

$$C'_1 = \frac{M_a \cdot L_p^3}{3 \cdot L_t^2} \cdot \left( 1 - \frac{E_1 \cdot I_1}{E_2 \cdot I_2} \right) + \frac{M_a \cdot L_t}{6}$$

$$C'_2 = -\frac{M_a \cdot L_t^2}{6}$$

$$D'_1 = \frac{M_a \cdot L p^2}{6 \cdot L_t^2} \cdot \left( 1 - \frac{E_2 \cdot I_2}{E_1 \cdot I_1} \right) \cdot$$

$$(L_t + 2 \cdot L) + \frac{E_2 \cdot I_2}{E_1 \cdot I_1} \cdot \frac{M_a \cdot L_t}{6}$$

$$D'_2 = -\frac{M_a \cdot L p^2}{6 \cdot L_t} \cdot \left( 1 - \frac{E_2 \cdot I_2}{E_1 \cdot I_1} \right) \cdot$$

$$C''_1 = \frac{M_b \cdot L^2}{6 \cdot L_t^2} \cdot \left(1 - \frac{E_1 \cdot I_1}{E_2 \cdot I_2}\right) \cdot \frac{(L_t + 2 \cdot L) - \frac{E_2 \cdot I_2}{E_1 \cdot I_1} \cdot \frac{M_a \cdot L_t^2}{6}}{(L_t + 2 \cdot L_p) + \frac{E_1 \cdot I_1}{E_2 \cdot I_2} \cdot \frac{M_b \cdot L_t}{6}}$$

$$D''_1 = \frac{M_b \cdot L^3}{3 \cdot L_t^2} \cdot \left(1 - \frac{E_2 \cdot I_2}{E_1 \cdot I_1}\right) + \frac{M_b \cdot L_t}{6}$$

$$D''_2 = -\frac{M_B \cdot L^3}{3 \cdot L_t} \cdot \left(\frac{E_2 \cdot I_2}{E_1 \cdot I_1}\right)$$

$M_a$ and $M_b$ are the reaction moments of the beam at the two housings. Two supplementary conditions are imposed: the deformation of the complete system must have tangents horizontal to the housings A and O.

The following system is then obtained, whereof the solutions are the moments $Ma$ and $Mb$, determined as a function of the characteristics of the materials and the geometrical dimensions of the studied system:

$$\alpha_1 \cdot M_a + \beta_1 \cdot M_b = \gamma_1$$

$$\alpha_2 \cdot M_a + \beta_2 \cdot M_b = \gamma_2$$

hence the solutions:

$$M_a = \frac{\beta_2 \cdot \gamma_1 - \beta_1 \cdot \beta_2}{\alpha_1 \cdot \beta_2 - \alpha_2 \cdot \beta_1}$$

$$M_b = \frac{\alpha_2 \cdot \gamma_1 - \alpha_1 \cdot \beta_2}{\alpha_2 \cdot \beta_1 - \alpha_1 \cdot \beta_2}$$

$$\alpha_1 = 2 \cdot \left(L_t - \frac{L_p^3}{L_t^2} \cdot \left(1 - \frac{E_1 \cdot I_1}{E_2 \cdot I_2}\right)\right)$$

$$\beta_1 = -\left(\frac{L^2}{L_t^2} \cdot \left(1 - \frac{E_1 \cdot I_1}{E_2 \cdot I_2}\right) \cdot (L_t + 2 \cdot L_p) + \frac{E_1 \cdot I_1}{E_2 \cdot I_2} \cdot L_t\right)$$

$$\alpha_2 = \left(\frac{L^2}{L_t^2} \cdot \left(1 - \frac{E_2 \cdot I_2}{E_1 \cdot I_1}\right) \cdot (L_t + 2 \cdot L) + \frac{E_2 \cdot I_2}{E_1 \cdot I_1} \cdot L_t\right)$$

$$\beta_2 = -2 \cdot \left(L_t - \frac{L^3}{L_t^2} \cdot \left(1 - \frac{E_2 \cdot I_2}{E_1 \cdot I_1}\right)\right)$$

$$\gamma_1 = \frac{P \cdot L_p \cdot L^2}{L_t^2} \cdot \left(1 - \frac{E_1 \cdot I_1}{E_2 \cdot I_2}\right) \cdot (L_t + 2 \cdot L_p) +$$

$$\frac{P \cdot L_p}{L_t} \cdot \frac{E_1 \cdot I_1}{E_2 \cdot I_2} \cdot (L_t^2 - L_p^2)$$

$$\gamma_2 = \frac{P \cdot L \cdot L_p}{L_t} \cdot (2 \cdot L_t - L_p) - \frac{2 \cdot P \cdot L^3 \cdot L_p}{L_t^2} \cdot \left(1 - \frac{E_2 \cdot I_2}{E_1 \cdot I_1}\right)$$

The interesting value is the deviation of the system at the critical point, which does not necessarily correspond to the maximum deviation of the complete system. In the present case, the deviation of the end of the main beam is of interest to us and this is:

$$D_t = z_1(L) = z_2(L).$$

It is then necessary to dimension the compensating system choosing the parameters ($L_p$, $E_2$, $I_2$) in such a way as to obtain a deviation $D_t$ lower than the critical value $D_c$, which represents the acceptable deviation fixed at the outset. This more particularly applies in the case of an optomechanical switch in order to limit optical losses.

The following examples relates to the numerical application to an optomechanical switch. It is pointed out that the aim is to stiffen the assembly in the vertical direction in order to align the optical guides, whilst retaining the flexibility in the direction of the deviation, e.g. of an electrostatic or electromagnetic nature.

The simplest configuration has been chosen for the digital application, namely that shown in FIG. 4, the compensating arms being at right angles. If each right angle has two orthogonal arm segments, a segment of length $L_1$ and a segment of length $L_2$, each arm can be likened to a straight arm, whose length $L_p$ is equal to $L_1+L_2$. This means that the influence of the torsion of the compensating beam at the angle between the two arm segments is ignored.

h is the height (in direction z) and l the width (in direction y) of the main beam and $l_p$ is the width and $h_p$ the height (still in direction z) of the section of the compensating beam. Thus, the moment of inertia of the main beam is:

$$1_t = \frac{(l \times h)^3}{12}$$

for a deviation in direction z. The moment of inertia of the compensating system is:

$$l_2 = \frac{(l_p \times h_p)^3}{6}$$

for a deviation in direction z.

The method was applied to a system whose parameters have the following values:

main beam:
$E_1 = 7 \times 10^{10} N/m^2$, L=2000 μm, l=30 μm, h=25 μm,
compensating system:
$E_2 = 7 \times 10^{10} N/m^2$, $l_p = 2$ μm, $h_p = 25$ μm, $L_p$=length to be determined.

As a function of the length of the arms, the parasitic deviations are compensated to a greater or lesser extent. The results are given for several cases in the following table I. The values indicated therein are the deviations at the force application point, i.e. at the end of the main beam. This value does not correspond to the maximum deviation of the structure which, in general, is not located at the force application point.

TABLE I

| Parasitic deviation D (microns) | Deviation with arms (microns) $L_p$ = 1000 microns | Deviation with arms (microns) $L_p$ = 500 microns | Deviation with arms (microns) $L_p$ = 200 microns |
| --- | --- | --- | --- |
| 50 | 6.45 | 1.40 | 0.15 |
| 20 | 2.58 | 0.56 | 0.06 |
| 1 | 0.13 | 0.03 | 0.00 |

On the basis of the numerical results, it is clear that the compensating arm system is able to make good part of the parasitic deviation.

Thus, for example, if it is wished to bring the 20 um deviation of the 2 mm long beams to a value below 1 micron, which is very compatible with integrated optics, it is necessary to add the compensating system constituted by two 500 μm long arms. If it is wished to pass to a deviation below 0.1 μm, two 200 um long arms would be used.

Once the necessary length of the compensating arms has been determined, the production of the system is identical to that described in FR-A-2 660 444 (U.S. Pat. No 5,078,514). The arms are produced at the same time as the main beam by etching. Only the geometry of the mask chosen for carrying out the etching changes.

In the previously given embodiment, the arms are consequently formed by the films 12 and 16.

Figure 6:
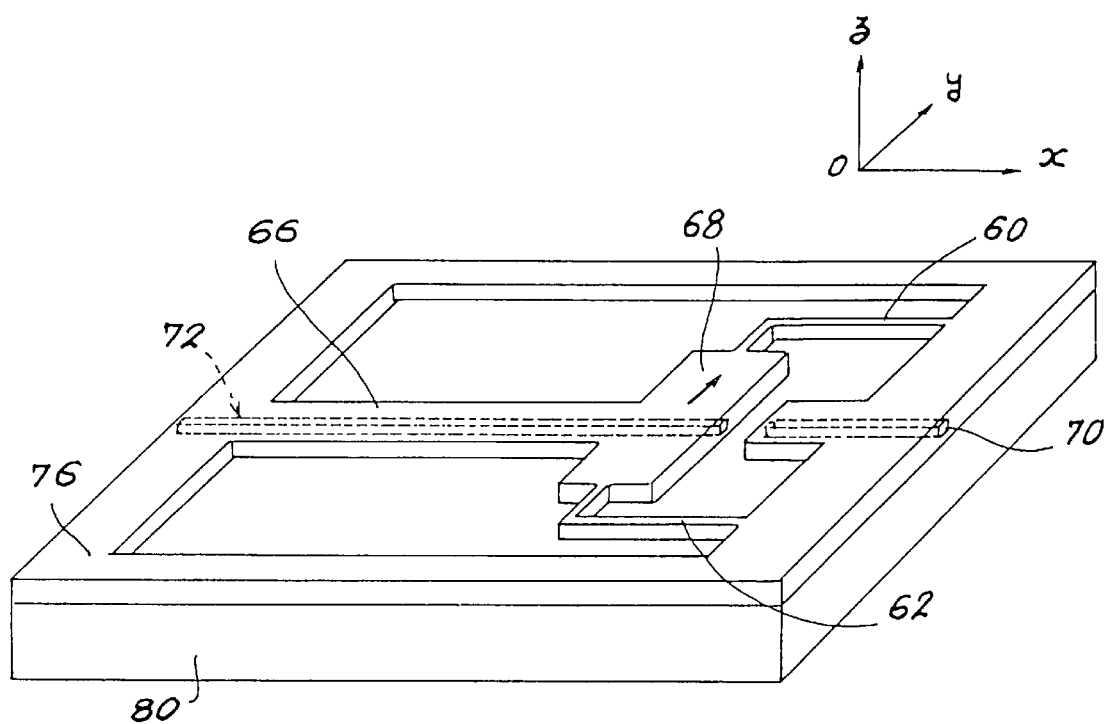
FIG. 6 An accelerometer with a compensating device according to the invention.

The following example (FIG. 6) relates to the field of accelerometry and more particularly to an optomechanical accelerometer.

The accelerometer is produced in a film 76 (e.g. of silica), which rests on a substrate 80 (e.g. of silicon). Under the influence of an acceleration Y, a mass 68 placed at the end of a beam 66 is laterally displaced bringing about a deviation of an optical guide 76, which passes longitudinally through said beam 66. In the inoperative state, the exit of said guide 72 faces the entrance of a guide 70, incorporated into the fixed part, namely the film 76. The acceleration brings about an offcentring of the entrance guide 72 and the exit guide 70 in direction y. An entrance light beam is carried by the guide 72 and at the outlet of the guide 70 the transmitted intensity is measured. In the case of lateral acceleration (Y), there is a modification of the light intensity at the exit, which is directly linked with the acceleration Y. However, to be able to perform a correct measurement, the two guides must be aligned in direction z in the inoperative state, which reveals the interest of the mechanical compensating arms 60, 62. The technical effect obtained by these two arms is to give an adequate rigidity to the mass 68, in the vertical direction z, whilst still allowing it to move freely in the direction y. The dimensioning of said two arms can be brought about with the aid of the method described hereinbefore. It is also possible to use arms having other shapes, e.g. that of FIG. 3b.

In more general terms, the invention which has been described makes it possible to check and control deformations of mechanical structures produced in films having a stress gradient. It is thus possible to preserve the alignment of the optical guides on integrated optics chips having a mechanical structure. Thus, the invention applies to all industrial solutions requiring an integrated optomechanical system, where the alignment of the optical guides causes problems. It is thus possible to produce accelerometers, microphones, pressure detectors, etc., but also active devices for telecommunications, such as the optomechanical switch making it possible to transfer a light signal carried by an optical fibre to a random fibre of an output optical fibre network.

In addition, the applications are not limited to devices where use is made of optical guides, because the problem of the deviation of a mobile structure in one direction with respect to a fixed structure can also arise in apparatuses using e.g. variable capacitance capacitors, one of the capacitor armatures being connected to a mobile structure and the other armature to a fixed structure.

We claim:

1. Device for compensating deformations, in a first direction (z), of a mobile part of a micromechanical apparatus, the mobile part having a fixed end attached to a fixed part of the apparatus and a free end displaceable in a second direction (y), different from the first direction (z), said compensation device being characterized in that it has at least one arm connecting the free end of the mobile part to the fixed part of the apparatus, said at least one arm having an adequate flexibility in the second direction (y), so as not to impede the displacement of the mobile part in said second direction (y), and an adequate rigidity in the first direction (z), so as to limit the deformations of the mobile part in said first direction.

2. Device according to claim 1, the at least one arm being connected to the fixed part positioned laterally of the mobile part or to the fixed part facing the free end of said mobile part.

3. Device according to either of the claims 1 and 2, the mobile part having several interconnected beams.

4. Compensating device according to either of the claims 1 and 2, the first (z) and the second (y) directions being perpendicular to one another.

5. Compensating device according to one of the claims 1 or 2, there being two arms.

6. Compensating device according to claim 5, the mobile part having a symmetry with respect to a median plane, the two arms being symmetrical to one another with respect to said same median plane.

7. Compensating device according to either of the claims 1 and 2, the at least one arm being right-angled, with two segments substantially perpendicular to one another.

8. Compensating device according to either of the claims 1 and 2, the at least one arm having a U-shaped body, with a branch added to the free end substantially perpendicular to each lateral branch of the U-shaped body.

9. Compensating device according to either of the claims 1 and 2, the at least one arm being straight.

10. Optomechanical switch having a compensating device according to either of the claims 1 and 2, the mobile part having a beam equipped with a central microguide.

11. Optomechanical switch according to claim 10, also comprising a substrate supporting a guide structure, in which is defined the beam having the microguide, a recess made in the substrate, an entrance microguide and two exit microguides defined in the guide structure, the entrance and exit microguides being located on either side of the recess and means for controlling the displacement of the beam.

12. Optomechanical accelerometer incorporating a compensating device according to either of the claims 1 and 2, the mobile part being constituted by a mass placed at the free end of one or more beams.

13. Accelerometer according to claim 12, also comprising a substrate supporting a layer in which is defined the mass and the beam or beams.

14. Accelerometer according to claim 13, comprising an optical guide passing longitudinally through a beam, at least one optical guide incorporated into the layer and positioned facing the free end of the beam.

15. Apparatus having an optical guiding structure, with a mobile part having a fixed end attached to a fixed part of the apparatus and a free end, said apparatus also having a compensating device, for deformations in a first direction (z), of the mobile part, the mobile part being displaceable in a second direction (y), different from the first direction (z), said compensating device having at least one arm connecting the free end of the mobile part to the fixed part of the apparatus, said at least one arm having an adequate flexibility in the second direction (y), so as not to impede the displacement of the mobile part in said second direction (y), and an adequate rigidity in the first direction (z) to limit the deformations of the mobile part in said first direction.

16. Apparatus according to claim 15 having a compensating device according to any one of the claims 2 to 9.

17. Process for determining the dimensioning of the at least one arm of a compensating device according to either of the claims 1 and 2, wherein:

determination takes place at a critical point of a parasitic deformation D of the mobile part in the first direction (z), in the case where the mobile part has no compensating device, an equivalent mechanical loading P which represents a loading that would bring about said deformation D without any compensating system at the critical point is calculated, the loading P is applied to the assembly constituted by the mobile part and the compensating device and from it is deduced the mechanical deformation $D_t$ of the mobile part with the compensating device, dimensioning of the compensating device is deduced therefrom so that the parasitic deformation $D_t$ is below a desired limit value $D_c$.

18. Process according to claim 17, wherein modelling takes place of the mobile part in the form of a beam having the same length, same moment of inertia and same modulus of elasticity as said mobile part and wherein modelling take place of the at least one arm in the form of a second beam, and mechanical parameters are determined to obtain the dimensioning of the at least one arm.

19. Process according to claim 17, wherein determination takes place of parameters of the length ($L_p$) and/or the modulus of elasticity ($E_2$) and/or the moment of inertia ($I_2$) of the beam, which models the at least one arm.

20. Device for compensating deformations, in a first direction (z), of a mobile part of an apparatus having an optical guidance structure, the mobile part having a fixed end attached to a fixed part of the apparatus and a free end displaceable in a second direction (y), different from the first direction (z), said compensation device being characterized in that it has at least one arm connecting the free end of the mobile part to the fixed part of the apparatus, said at least one arm having an adequate flexibility in the second direction (y), so as not to impede the displacement of the mobile part in said second direction (y), and an adequate rigidity in the first direction (z), so as to limit the deformations of the mobile part in said first direction.

21. Device according to claim 20, the at least one arm being connected to the fixed part positioned laterally of the mobile part or to the fixed part facing the free end of said mobile part.

22. Device according to either of the claims 20 and 21, the mobile part having several interconnected beams.

23. Compensating device according to either of the claims 20 and 21, the first (z) and the second (y) directions being perpendicular to one another.

24. Compensating device according to one of the claims 20 or 21, there being two arms.

25. Compensating device according to claim 24, the mobile part having a symmetry with respect to a median plane, the two arms being symmetrical to one another with respect to said same median plane.

26. Compensating device according to either of the claims 20 and 21, the at least one arm being right-angled, with two segments substantially perpendicular to one another.

27. Compensating device according to either of the claims 20 and 21, the at least one arm having a U-shaped body, with a branch added to the free end substantially perpendicular to each lateral branch of the U-shaped body.

28. Compensating device according to either of the claims 20 and 21, the at least one arm being straight.

29. Optomechanical switch having a compensating device according to either of the claims 20 and 21, the mobile part having a beam equipped with a central microguide.

30. Optomechanical switch according to claim 29, also comprising a substrate supporting a guide structure, in which is defined the beam having the microguide, a recess made in the substrate, an entrance microguide and two exit microguides defined in the guide structure, the entrance and exit microguides being located on either side of the recess and means for controlling the displacement of the beam.

31. Optomechanical accelerometer incorporating a compensating device according to either of the claims 20 and 21, the mobile part being constituted by a mass placed at the free end of one or more beams.

32. Accelerometer according to claim 31, also comprising a substrate supporting a layer in which is defined the mass and the beam or beams.

33. Accelerometer according to claim 32, comprising an optical guide passing longitudinally through a beam, at least one optical guide incorporated into the layer and positioned facing the free end of the beam.

* * * * *

UNITED STATES PATENT AND TRADEMARK OFFICE
CERTIFICATE OF CORRECTION

PATENT NO. : 5,848,206
DATED : December 8, 1998
INVENTOR(S) : Labeye et al.

It is certified that error appears in the above-indentified patent and that said Letters Patent is hereby corrected as shown below:

Col. 9, lines 13-15, delete " $D''_2 = -\dfrac{M_B \cdot L^3}{3 \cdot L_t} \cdot \left(\dfrac{E_2 \cdot I_2}{E_1 \cdot I_1}\right)$ "

and insert therefor -- $D''_2 = -\dfrac{M_B \cdot L^3}{3 \cdot L_t} \cdot \left(1 - \dfrac{E_2 \cdot I_2}{E_1 \cdot I_1}\right)$ --.

Col. 9, lines 31 and 32, delete " $M_a = \dfrac{\beta_2 \cdot \gamma_1 - \beta_1 \cdot \beta_2}{\alpha_1 \cdot \beta_1 - \alpha_2 \cdot \beta_1}$ "

and insert therefor -- $M_a = \dfrac{\beta_2 \cdot \gamma_1 - \beta_1 \cdot \gamma_2}{\alpha_1 \cdot \beta_2 - \alpha_2 \cdot \beta_1}$ --.

Col. 9, lines 34 and 35, delete " $M_b = \dfrac{\alpha_2 \cdot \gamma_1 - \alpha_1 \cdot \beta_2}{\alpha_2 \cdot \beta_1 - \alpha_1 \cdot \beta_2}$ "

and insert therefor -- $M_b = \dfrac{\alpha_2 \cdot \gamma_1 - \alpha_1 \cdot \gamma_2}{\alpha_2 \cdot \beta_1 - \alpha_1 \cdot \beta_2}$ --.

Signed and Sealed this

Nineteenth Day of October, 1999

Attest:

Q. TODD DICKINSON

*Attesting Officer*   *Acting Commissioner of Patents and Trademarks*